US009792003B1

(12) United States Patent
Story, Jr. et al.

(10) Patent No.: US 9,792,003 B1
(45) Date of Patent: Oct. 17, 2017

(54) DYNAMIC FORMAT SELECTION AND DELIVERY

(71) Applicant: Audible, Inc., Newark, NJ (US)

(72) Inventors: Guy Ashley Story, Jr., New York, NY (US); Beth Anderson, Brooklyn, NY (US); Ajay Arora, New York, NY (US); Andrew Bennett Gaies, New York, NY (US); Foy C. Sperring, Jr., Bay Shore, NY (US)

(73) Assignee: Audible, Inc., Newark, NJ (US)

( * ) Notice: Subject to any disclaimer, the term of this patent is extended or adjusted under 35 U.S.C. 154(b) by 454 days.

(21) Appl. No.: 14/040,495

(22) Filed: Sep. 27, 2013

(51) Int. Cl.
*G06F 3/048* (2013.01)
*G06F 3/0484* (2013.01)
*G06F 17/30* (2006.01)

(52) U.S. Cl.
CPC ...... *G06F 3/0484* (2013.01); *G06F 17/30017* (2013.01); *G06F 17/30867* (2013.01)

(58) Field of Classification Search
CPC ............. G06F 3/0484; G06F 17/30017; G06F 17/30867
See application file for complete search history.

(56) References Cited

U.S. PATENT DOCUMENTS

| | | | | |
|---|---|---|---|---|
| 8,068,925 B2* | 11/2011 | McKillop | ............... | G06F 3/165 381/77 |
| 8,638,344 B2* | 1/2014 | Jaramillo | ................. | G09G 5/00 345/619 |
| 9,047,784 B2* | 6/2015 | Brownlow | ............... | G09B 5/06 |
| 9,146,893 B1* | 9/2015 | Garg | ........................ | G06F 15/16 |
| 2003/0217121 A1* | 11/2003 | Willis | ............... | G06F 17/30867 709/219 |
| 2005/0022113 A1* | 1/2005 | Hanlon | ............... | G06F 17/3002 715/229 |
| 2006/0167977 A1* | 7/2006 | Wu et al. | ................ | H04L 29/06 709/203 |
| 2010/0093271 A1* | 4/2010 | Nowlan | .............. | H04M 19/041 455/3.01 |
| 2010/0145991 A1* | 6/2010 | Gannon | ............ | G06F 17/30056 707/781 |
| 2011/0126119 A1* | 5/2011 | Young | ............... | G06F 17/30905 715/744 |
| 2012/0053829 A1* | 3/2012 | Agarwal | ................ | G01C 21/20 701/418 |
| 2013/0080890 A1* | 3/2013 | Krishnamurthi | ...... | H04W 4/001 715/702 |

(Continued)

*Primary Examiner* — Doon Chow
*Assistant Examiner* — Andrew T Chiusano
(74) *Attorney, Agent, or Firm* — Knobbe, Martens, Olson & Bear, LLP (57) ABSTRACT

Systems and methods are provided for generating user format preference data and using that data to select and/or deliver a specific format of a work. For example, a dynamic format delivery service can dynamically collect data representing a user's preferences respecting specific contexts and formats, and can store this data in association with the user. The dynamic format delivery service can then make use of that data to dynamically select a format for a requested work in order to provide the user with a format tailored to that specific user's consumption habits. Moreover, data representing preferences of a population of users, context attributes, or device-specific format preferences may further contribute to selecting a work format.

25 Claims, 6 Drawing Sheets

(56) References Cited

U.S. PATENT DOCUMENTS

| | | | |
|---|---|---|---|
| 2013/0238580 A1* | 9/2013 | D'Orazio Pedro De Matos ....... | G06F 17/30017 707/705 |
| 2013/0262483 A1* | 10/2013 | Blom ................ | G06F 17/30867 707/752 |
| 2014/0214551 A1* | 7/2014 | Baluja ................ | G06Q 30/0255 705/14.66 |
| 2015/0169703 A1* | 6/2015 | Chang ................ | G06F 17/30554 707/723 |
| 2015/0213723 A1* | 7/2015 | Vattikonda ............... | G09B 5/00 434/322 |

* cited by examiner

FORMAT ASSOCIATIONS DATA (EXAMPLES)

| Context Attribute | Format |
|---|---|
| <ambient light = high> | <format = audio> |
| <ambient noise = high> | if <headphones = no> then <format = text> and if <headphones = yes> then format = audio> |
| <location type = public space> | if <headphones = no> then <format = text> and if <headphones = yes> then format = audio> |
| <movement = yes> | <format = audio> |
| <movement = no> | <format = text> |
| <face detected = yes> | <format = text> |
| <face detected = no> | <format = audio> |

| Work | Format | Preferred File |
|---|---|---|
| *Pride and Prejudice* by Jane Austen | <format = text> | <file = "PrideAndPrejudice_TopFiveClassics.mobi"> |
| *The Great Gatsby* by F. Scott | <format = movie> | <file = "TheGreatGatsby_2013.m2ts"> |
| *Gulliver's Travels* by Jonathan Swift | <format = audio> | <file = "GulliversTravels_AdaptedForYoungListeners_narratorSimonVance.wav"> |

DYNAMIC FORMAT SELECTION AND DELIVERY

BACKGROUND

Electronic commerce is a popular way of selling items, such as digital content items, to consumers. A typical electronic commerce system may generate user interfaces that enable consumers to browse and/or purchase items from a merchant or seller associated with the electronic commerce system. Often, items of digital content, such as audio books, are available in multiple formats. Recommendation components or engines are sometimes used by electronic commerce systems to suggest or recommend items, including items of digital content, to their customers.

Items can be recommended based on purchase or browse histories of users. Recommendation components or engines typically attempt to identify and/or present items that may be of general interest to a given user. For example, an electronic commerce service may provide a list of recommended items for a user that are selected based on a determination that the recommended items are similar to items the given user has purchased or browsed in the past. As another example, some recommendation services may recommend items that have been previously purchased by users with similar interests to the given user. When determining a content item to recommend to a user, a recommendation service can consider information regarding the user, such as information about current and past user behavior.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

I. Introduction

Generally described, a dynamic format delivery service as disclosed herein may determine one or more formats of a work that are recommended for a user to consume while in a noisy environment, while commuting to work on the train, while outside on a sunny day, while relaxing before going to sleep, or in some other context. A user may purchase or otherwise acquire a work from an electronic catalog. Purchasing or acquiring the work, rather than an individual format of the work, can provide the user with access to some or all formats in which the work is available (e.g., electronic book, audio book, movie, etc.) for the work. To illustrate, a user may purchase the work Pride and Prejudice, by Jane Austen, and by purchasing the work may gain access to an audio book format of the work and an electronic book ("e-book") format of the work. In some embodiments, some or all of a movie format, a soundtrack, a physical book, an immersion reading experience (in which an audio book corresponding to an e-book is presented to the user simultaneously with the e-book), footnotes, translations, and other interpretations or formats may be included in the purchase of the work. Some embodiments of a work may include multiple versions of an audio book as narrated by different narrators. There may also be multiple editions of an e-book version of a work, for example, an illustrated and a non-illustrated edition or other variations, as well as multiple editions of a movie version of a work, for example, a classic movie and a modern rendition of the movie, or a cartoon movie and a live-acting movie.

In some embodiments, the context in which the work is to be consumed may be determined based on information received by the dynamic format delivery service from a computing device of the user, such as environment information, geographic location data, time and date information, and/or other information. The dynamic format delivery service may receive similar context data during various users' consumption of works using their respective computing devices, such that the dynamic format delivery service may determine context attributes that identify one or more contexts in which various formats of works in an electronic catalog are most often consumed by a specific user or a population of users. In some embodiments, the dynamic format delivery service may store information that associates such context attributes with one or more formats, and may store information that associates works with a preferred format and/or a preferred content file. A preferred format or a preferred content file can also be determined based on user ratings of the formats or files associated with a work. In some embodiments, the dynamic format delivery service may store information that associates user format preferences with a user based on behavior of the user with respect to one or more works. When user preference or context information is later received from a user's computing device, such as context information describing a current context in which the user may be interested in consuming a work, the dynamic format delivery service may use the stored format, work, and context association information to deliver the work in one or more formats to the user.

As an example, a dynamic format delivery service as described herein may receive a user request for a work and deliver an audio book format of the work to which the user can listen. Selection of the audio book format may be based, at least in part, on the user's preference for listening to audio books, rather than reading e-books, e.g., while traveling. For example, the dynamic format delivery service may determine based on time and date that a user is traveling to work, or may determine based on a speed of the user device as provided by GPS data that the user is traveling. The dynamic format delivery service may select the audio book format of the work based at least in part on work consumption information previously received from the user's device, or from various other user devices, indicating the work to which the user is listening while traveling. In some embodiments, the dynamic format delivery service may additionally or alternatively determine formats that are appropriate for a specific work based at least in part on one or more users' votes or other feedback regarding the various formats of the work. For example, in some embodiments, a user interface presented on a user device during work consumption may include options that enable a user to select a different format, or other options that enable the user to indicate whether the current content format that the user is consuming is good or bad for consuming in the user's current context (such as traveling).

In some embodiments, a dynamic format delivery service as described herein may determine context attributes associated with a number of different contexts. For example, a speed of the user device may be determined to indicate traveling, while a level of ambient noise detected in the environment of the user device may be determined to indicate a public space. In some embodiments, formats that are popular or highly rated by a number of users in a context may be stored as population preference data, that may then be used to select such formats to deliver to another user to be consumed in that or a similar context. As will be discussed further below, a dynamic format delivery service may select formats based on a variety of context attributes and/or other information, such as the time of day, time of year, geographic region, etc. Depending on the embodiment, a dynamic format delivery service described herein may recognize and recommend work formats for a variety of context types, such as geographic locations, a specific room or type of room within a building or house (such as a bedroom, kitchen, etc.), a physical activity or exercise (such as running or weightlifting), a mode of transportation (such as taking a train), or a daily activity (such as grocery shopping, mowing the lawn, cooking, eating a meal, etc.).

In some embodiments, a dynamic format delivery service as described herein may determine user format preferences associated with a number of different contexts and/or works. For example, selection of an e-book for scientific literature may be determined to indicate a user preference for reading works associated with scientific topics, rather than listening to such works. The dynamic format delivery service may store this information in association with the user as user format preferences data for use in selecting formats for delivery to the user. Further, a user may indicate a preference for consuming audio books on a first user device of the user, and may indicate a preference for consuming e-books on a second user device of the user. The dynamic format delivery service may store such device-specific format preferences within the user format preferences data. As another example, device capabilities may be used to determine a work format to deliver to the user. Some embodiments may select a format based on a weighted combination of some or all of context attributes, population preference data, user format preferences, and device capabilities.

While works in audio book format and e-book format are often used as examples in the present disclosure, it should be appreciated that the dynamic format delivery service, in some embodiments, may be used to select a format for any content or item capable of being listened to, watched, played or otherwise consumed in multiple formats by a user. In some embodiments, formats recommended to a user may include digital formats, such as audio books, electronic books, footnotes, immersion readings, videos, podcasts, computer games, movies, songs, albums, playlists and/or digital content items of other types. In other embodiments, formats recommended to a user may include physical goods that are shipped to the user for consumption, such as books, magazines, games and/or various types of media that store audio and/or visual content.

II. Interactive Computing System Overview

Figure 1:
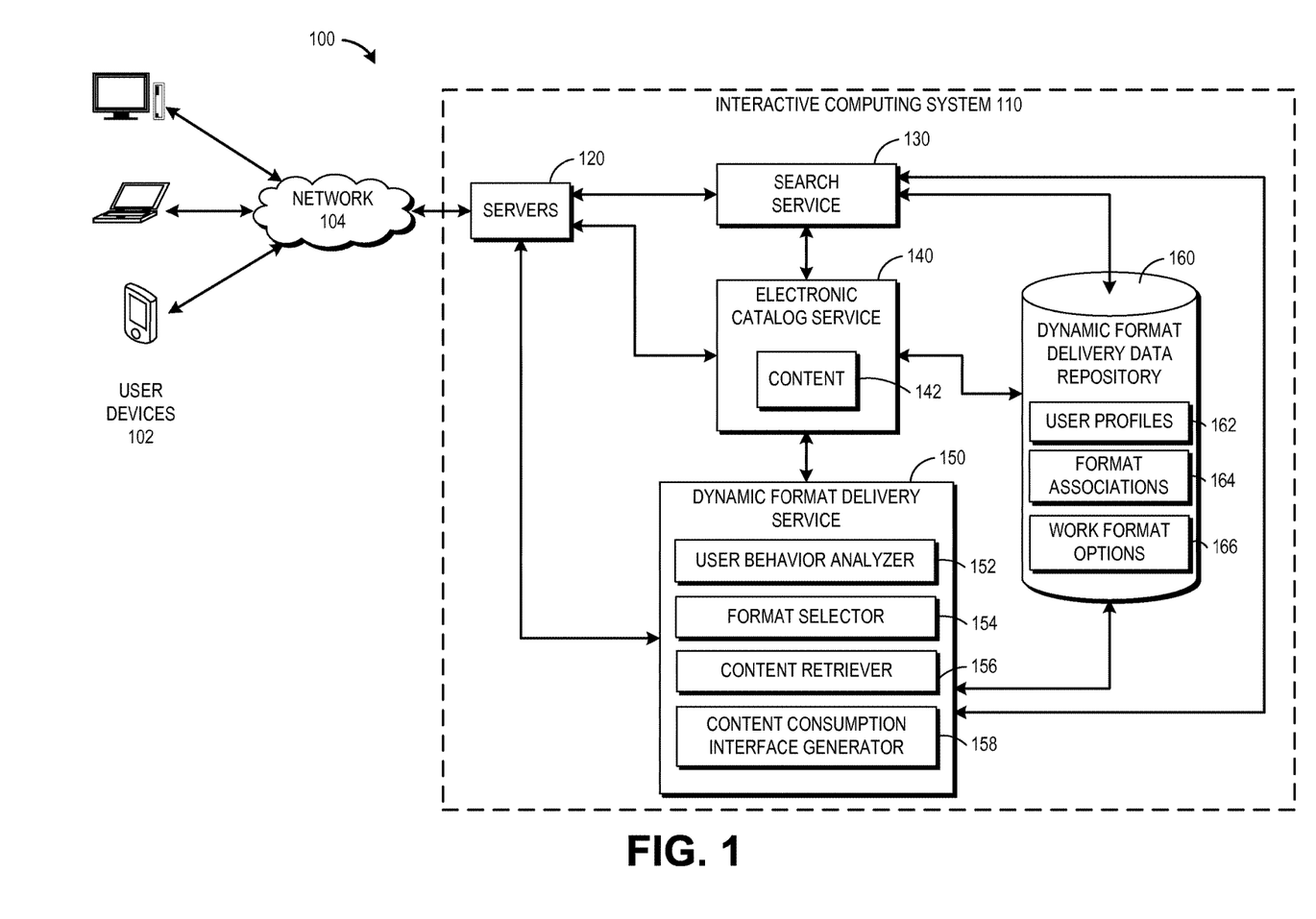
FIG. 1 illustrates an embodiment of a network environment for providing users with access to an interactive computing system capable of dynamically selecting and delivering a work in a format.

Prior to describing embodiments of the dynamic format delivery functionality in detail, an example computing system in which this functionality can be implemented will be described. Referring to FIG. 1, an embodiment of a network environment 100 is depicted that can provide users with access to an interactive computing system 110 for the purpose of providing users with access to an electronic catalog of items that users can browse or search to find items to purchase or otherwise access, among other features. In the environment 100, users can access the interactive computing system 110 with user devices 102. The electronic catalog service 140 of the interactive computing system 110 can provide access to content 142 found in an electronic catalog of items including a plurality of works, for example, items returned in response to a search request made through the search service 130 or a made by a browsing request. The dynamic format delivery service 150 of the interactive computing system 110 can provide a dynamically selected format for a requested work, for example, based on context or past user work consumption behavior. The interactive computing system 110 can include a dynamic format delivery data repository 160 configured to store data that may be used in format selection, for example, user profile data 162, format association data 164, and story format options data 166. Advantageously, in certain embodiments, the dynamic format delivery functionality of the dynamic format delivery service 150 can present a user with a requested work in a format that is more suited for consumption in the user's current context and/or is personalized to the user's format preferences.

The user devices 102 that access the interactive computing system 110 can include computing devices, such as desktop computers, laptop computers, tablets, personal digital assistants (PDAs), mobile phones (including smartphones), electronic book readers, other wireless devices, set-top or other television boxes, media players, game platforms, and kiosks, among others. The user devices 102 access the interactive computing system 110 over a network 104 that can be a local area network or a wide area network, such as the Internet, or a satellite network, such as a mobile communications network. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The interactive computing system 110 can include a dynamic format delivery service 150 that is capable of dynamically selecting a format in which to deliver a work in the electronic catalog to a user. Although the dynamic format delivery service 150 is illustrated as being a separate component, in some embodiments the dynamic format delivery service 150 may be incorporated into one of the electronic catalog service 140 or the search service 130. In the depicted embodiment, the dynamic format delivery service 150 includes a user behavior analysis component 152, a format selection component 154, a content retrieval component 156, and a content consumption interface generation component 158. Each of these components can be implemented in hardware and/or software.

The dynamic format delivery service 150 may receive a user request for a work, for example, in response to a user purchasing or otherwise acquiring a work from the electronic catalog service 140 and selecting the work for presentation on a user device 102. Before or after receiving the user request for the work, the user behavior analysis component 152 can analyze the behavior of the user with respect to an electronic catalog to collect and store data representing contextual format preferences of the user while consuming different types of works. In some embodiments, the user behavior analysis component 152 may also analyze the behavior of the user with respect to other systems connected to the electronic catalog via the network 104. The behavior of the user can include both explicit and implicit cues as to what format styles the user may prefer in a context. In some embodiments, device-specific format preferences of the user may be determined based on user behavior on a variety of user devices 102 associated with the user. This format preference data can be stored in a user profile 162 in a dynamic format delivery data repository 160 for later use identifying an appropriate format in which to deliver a requested work to the user.

The user behavior analysis component 152 can also analyze context attributes to determine a current context or environment of the user when the request for a work is made or while the user is consuming a work. For example, the user behavior analysis component 152 can receive input from a microphone of the user device, in some embodiments, to determine a context attribute of the ambient noise level around the user. Noise levels above a threshold may be associated with a noisy environment, and noise levels below a threshold may be associated with a quiet environment. In some embodiments, user behavior analysis component 152 can receive input from the camera of the user device to analyze context attributes such as ambient light levels and whether a display of the device is facing the user. In some embodiments, user behavior analysis component 152 can receive input from a GPS or other location data module of the user device in order to analyze context attributes such as location and speed of movement of the user. To illustrate, GPS coordinates of a known public park or museum may be associated with a context of public space, and GPS coordinates indicating movement above a threshold speed may indicate travel.

The format selection component 154 can access data stored in the format associations 164 of the format delivery data repository 160 to select a format in which to deliver a work to a user. The format association data 164 may include an association of a context attribute with a format, in some embodiments. In some embodiments, the format association data 164 may include an association of a work with a preferred format, and the work may be additionally or alternatively associated with a preferred file of a format of the work. The format association data 164 can be generated, in some embodiments, by aggregate behavior of a population of users with respect to the electronic catalog maintained by the electronic catalog service 140. The format association data 164 may also be input based on development decisions. The format selection component 154 can select a format in which to deliver the work to the user based at least partly on the format association data 164. In some embodiments, the format selection component 154 can receive input from the user behavior analysis component 152, and may select the format in which to deliver the work based on identified format preferences of the user and/or the user's current context. The format may be selected from work format options data 166 indicating the formats in which the work is available for selection and delivery from the electronic catalog. In some embodiments, the work format options data 166 may be updated when new formats or versions of a work become available.

The content retrieval component 156 can determine how the work will be delivered to the user. In some embodiments, the content retrieval component 156 can receive input from user behavior analysis component 152 regarding a user device 102 making the request for the work, or all user devices associated with the user or on the person of the user. The content retrieval component 156 can determine whether to prefetch the work or to stream the work to the requesting user device. The content retrieval component 156 may make decisions, in some embodiments, regarding whether to prefetch the work in the selected format or in all available formats to the requesting device or all of the user's devices, or in some embodiments to prefetch the work to the user devices currently on the person of the user. The content retrieval component 156 can additionally or alternatively decide whether to prefetch or stream the work based on one or more of bandwidth of a requesting device, reliability of network connectivity of the requesting device, cost of bandwidth for the device, whether local storage is available on the requesting device, and whether the selected format itself is more suited to streaming or prefetching.

The content consumption interface generation component 158 can generate a user interface for output to a user. The content consumption interface generation component 158 can receive input from the user behavior analysis component 152 and the format selector 154 regarding preferred, available, and selected format options for a requested work, and may use data from the format delivery data repository 160 to generate a user interface based on the preferred, available, and selected format options. The user interface may include the work in the selected format and an amount of requested content to display in the selected format style, and may also include user interface elements to present to the user.

The interactive computing system 110 can be implemented with one or more physical servers or computing machines, including the servers 120 shown (among possibly others), that may be geographically dispersed or co-located. Thus, each of the components depicted in the interactive computing system 110 can include hardware and/or software for performing various features. In one embodiment, the interactive computing system 110 is a network site or a collection of network sites that serve network pages to users. In another embodiment, the interactive computing system 110 hosts content for one or more mobile applications or other applications executed by the user devices 102. For ease of illustration, this specification often refers to graphical user interfaces in the network site context. However, it should be understood that these user interfaces can be adapted for display in mobile applications or other applications other than a browser.

The processing of the various components of the interactive computing system 110 can be distributed across multiple machines, networks, or other computing resources. The various components of the interactive computing system 110 can also be implemented in one or more virtual machines or hosted computing environment resources, rather than in dedicated servers. A hosted computing environment may include one or more rapidly provisioned and released computing resources, which computing resources may include computing, networking and/or storage devices. A hosted computing environment may also be referred to as a cloud computing environment. In some embodiments, the features and services provided by the interactive computing system 110 may be implemented as web services consumable via the network 104. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any subset of the components shown can communicate with any other subset of components in various implementations.

In one embodiment, the user devices 102 communicate with the servers 120 of the interactive computing system 110. These servers 120 can access back-end computing devices that may implement the other functionality of the interactive computing system 110 shown. Other computing arrangements and configurations are also possible.

The interactive computing system 110 may include an electronic catalog service 140 and a search service 130 in the depicted embodiment. Users can browse content 142 provided by the catalog service 140 or query the search service 130 to obtain information about the electronic catalog content 142. The content 142 can include a plurality of works, for example, literary works such as books or poems, and each of the works may be available in multiple formats in some embodiments. For example, a work may be available as an audio book, an e-book, a physical book, and an immersion reading experience. In one embodiment, the content 142 may include data regarding a plurality of items that may be products or services available for purchase or selection through the electronic catalog service 140. The electronic catalog content 142 can include detailed information about these works, as well as the products and services. In one embodiment, the content 142 may be arranged in a hierarchical structure, having works and/or items associated with one or more categories or browse nodes in a hierarchy (or graph). The catalog service 140 can provide functionality for users to browse the hierarchy in addition to searching the catalog. For example, users may be able to select an option to view all works within a certain category, and may further limit the works presented by selecting subcategories. Users can select a work represented in the hierarchy or in a list of search results to see more details about the work. In response to a user work selection, the server 120 can provide to a user device 102 a network page (sometimes called an item detail page) that includes details about the selected work, and that may include an option to purchase the selected work. The item detail page may include information on the formats in which the work is available.

These are just a few examples of the many dynamic format delivery features that are compatible with embodiments described herein. Additional example features of the dynamic format delivery methods and user interfaces are described in greater detail below. For purposes of illustration, many of the examples herein are described in the context of works within an electronic catalog. However, it should be understood that these examples can be adapted to recommendations or automatic delivery of other items of an electronic catalog, as described above, or to user interaction with other types of network systems.

III. Format Preference Identification Overview

Figure 2:
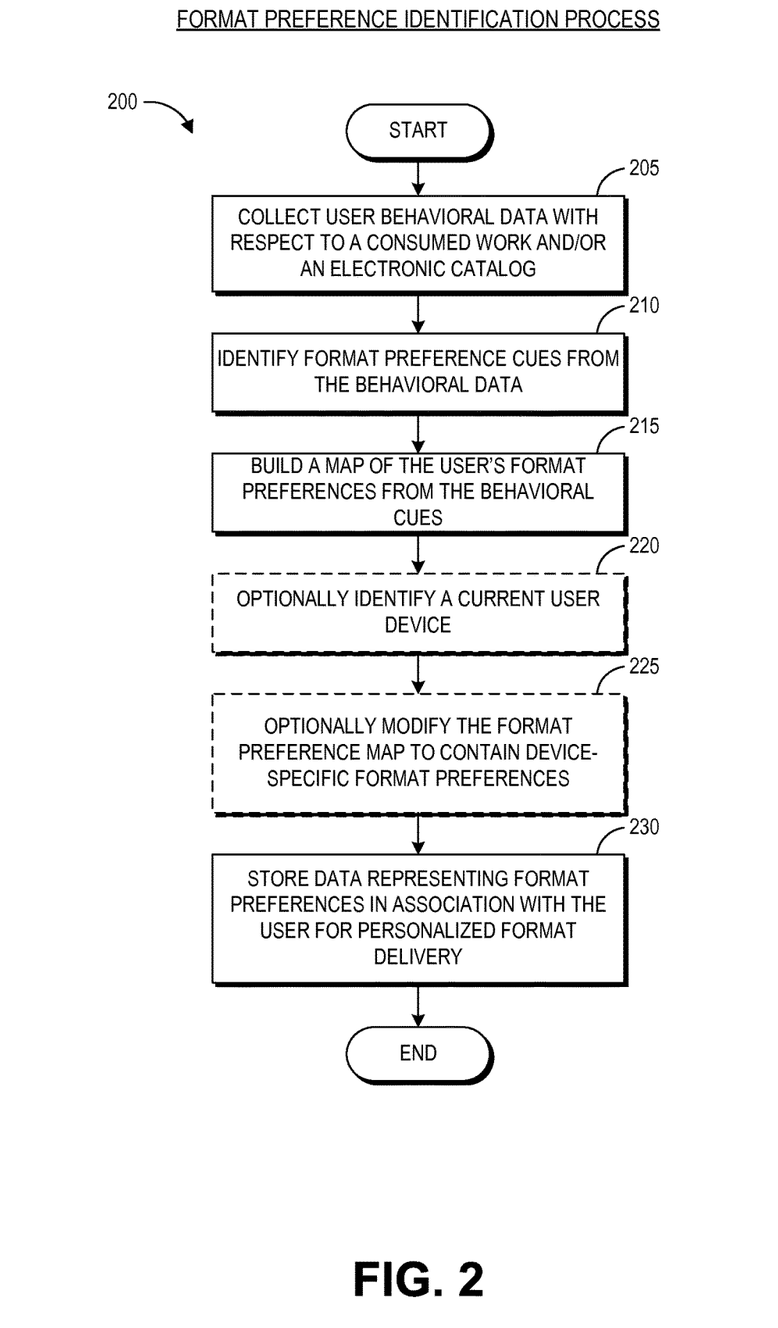
FIG. 2 illustrates a flow diagram of one embodiment of a format preference identification process.

FIG. 2 illustrates an embodiment of a format preference identification process 200. As described above, a user's preference for being presented with a works in a certain format in a certain context may be identified, by the user behavior analysis component 152, through the user's behavior with respect to the electronic catalog. The user behavior analysis component 152 can identify the user's format preferences through the user's behavior with respect to other networked systems as well. More generally, the user's format preferences can be inferred through past work consumption behavior of the user. The process 200 can identify the user's preferences and store data representing such preferences in association with the user for later use in customizing delivery of works to the user's preferences. Any computing device can implement the process 200. For ease of illustration, however, the process 200 is described as being implemented by the interactive computing system 110, and in particular, the user behavior analysis component 152 of the dynamic format delivery service 150.

At block 205, the user behavior analysis component 152 receives information regarding a user's behavioral data with respect to a consumed story and/or an electronic catalog, such as the catalog service 140 of FIG. 1. This information may be based on explicit cues and/or implicit cues in the user's behavior regarding what formats appeal to the user, and may be context and/or device specific. For example, explicit cues may be determined from user selection of a format when requesting a work. In some embodiments, explicit cues may include selections made in a preferences user interface that may be presented to a user in some embodiments, for example, upon user request, to allow the user to specify in which format the user prefers to consume a work or works in a given context, or on a device associated with the user. In some embodiments, the behavioral data of a single user may be received at block 205. In a particular embodiment, the user behavior analysis component 152 can be used to aggregate behavioral data from a population of users, and accordingly at block 205 may receive information regarding the behavioral data of many users.

Implicit cues, in some embodiments, can be inferred from user interaction with an item or a work in the electronic catalog, for example, by identifying a user selecting a work in a specific format for viewing or for purchase, or by identifying user patterns of browsing works. For example, some works may be available in only one format and the various formats of a work may be available for separate selection and/or purchase. An example of an implicit cue could be a click history of items selected by the user. A correlation between the user's click history, the user's order history, or the user's browsing history and a format of a set of the selected or browsed works may be an implicit cue as to a format preference.

Accordingly, at block 210, the user behavior analysis component 152 analyzes the explicit and/or implicit cues in the user's behavioral data to identify specific format preferences of the user. In one embodiment, the user behavior analysis component 152 may rely solely on either explicit or implicit cues to identify user format preferences. In another embodiment, explicit and implicit cues may be analyzed together to identify user format preferences. In some embodiments, the user behavior analysis component 152 may use the behavioral data to associate the user with a digital persona or profile stored in computer storage, such as the dynamic format delivery data repository 160 of FIG. 1. The persona may be associated with a plurality of format preferences that may in some embodiments be determined based on the work consumption behavior of a population of other users also associated with the persona. More generally, a persona can include data representing the aggregate or common format preferences of a plurality of users. The user behavior analysis component 152 may also associate multiple personas with a user that may reflect different format preferences of the user in different contexts or for different types of works.

At block 215, the user behavior analysis component 152 builds a map of the user's format preferences based on the analysis of the explicit and/or implicit behavioral cues. Data representing individual context, work, or device-specific formats for which the user behavior analysis component 152 determined the user's behavior indicated a preference may be merged together into a larger set of data that can be stored as a map, table(s), or other data type(s). For convenience, the remainder of this specification will refer to the set of data as being stored as a map, although other data types may be used. In one embodiment, if the behavioral data indicates that the user expressed a format preference, the user behavior analysis component 152 may access the format association data 164 in the dynamic format delivery data repository 160 to compare the user's behavioral data to a known list of format options and context attributes. The user behavior analysis component 152 may weight a plurality of user behavior factors to determine a preferred format style, or to determine a current context of the user. In some embodiments, a preferred format may be stored in association with the user. In other embodiments, a plurality of preferred formats may be stored in association with the user, for example, with each format preference mapped to a context attribute or work.

Optionally, at block 220, the user behavior analysis component 152 may identify a user device currently being used to access the system during the user behavior or request for a work. Device attributes may have ramifications for selecting the format most suitable for presenting the work to the user. In some embodiments, the user behavior analysis component 152 may determine device attributes from interaction with the device, for example, by determining bandwidth from latency in communications with the device, detecting headphones or a headphone jack, detecting speakers, or detecting a display type. In some embodiments the user device may transmit this information to the user behavior analysis component 152. The user behavior analysis component 152 may supplement or limit format selections based on user device capabilities. For example, a device with a display but no audio output is not suitable for presenting an audio book, and therefore the user behavior analysis component 152 may select an e-book format for such a device even if the audio book format is the user's preference for the current context or work. In one embodiment, the user behavior analysis component 152 may track device-specific content consumption behavior patterns of the user.

Optionally, at block 225, the user behavior analysis component 152 may adjust the format preference data in the map to obtain an enhanced map of the user's device-specific format preferences. In one embodiment, the format preferences data may be adjusted based on device attributes. For example, the user behavior analysis component 152 may determine that the user typically listens to audio books on a mobile device and reads electronic books on an e-reader device. The map of the user's format preferences may be structured in a manner that reflects device-specific format preferences. In another embodiment, the format preferences data may be adjusted based on work attributes. For example, the user behavior analysis component 152 may determine that the user typically listens to audio books of fictional literary works, but reads e-book versions of scientific or scholarly articles, books, and other works. Accordingly, user behavior analysis component 152 may structure the map of the user's format preferences in a manner that reflects format preferences specific to different types of works.

At block 230, the user behavior analysis component 152 stores the map of data representing the user's format preferences in association with the user (e.g., in association with a profile of the user). This format preference data may be stored in the user profiles 162 of the dynamic format delivery data repository 160 of FIG. 1. Later access to the stored format preferences data may be beneficial for personalizing the delivery of works available in multiple formats to users.

IV. Format Associations Overview

Figure 3A:
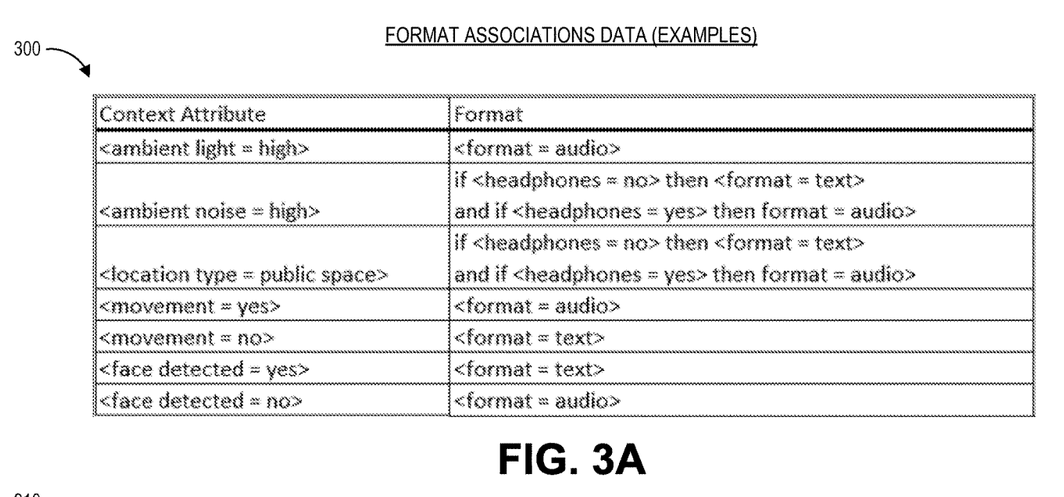
FIG. 3A illustrates a sample representation of information associating each of a number of content attributes with one or more formats in which a work has been consumed and/or in which the work is recommended for consumption.
Figure 3B:
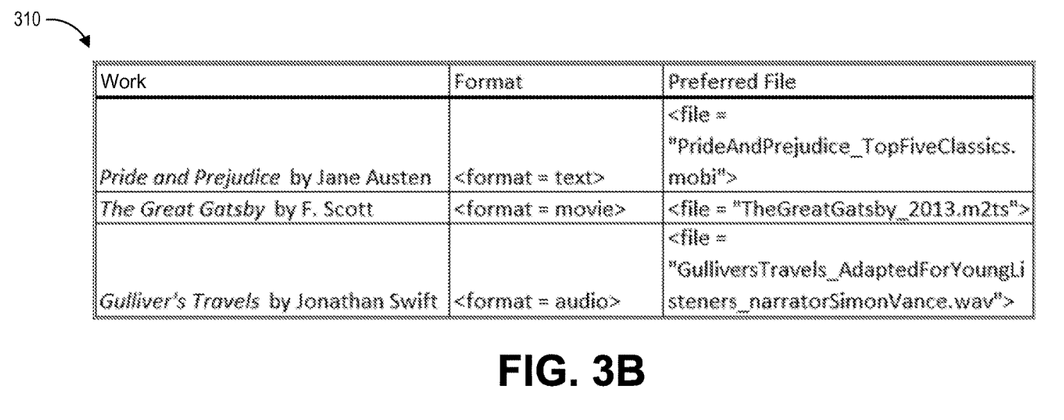
FIG. 3B illustrates a sample representation of information associating each of a number of works with a format and a file in which the work has been consumed and/or in which the work is recommended for consumption.

FIG. 3A illustrates an embodiment of an example table representation 300 of information associating each of a number of context attributes with a format or formats, and FIG. 3B illustrates an embodiment of an example table representation 310 of work, format, and preferred file associations. The table representation may generally be considered a partial graphical representation of sample data that may be stored in the format association data 164 and used by the format selection component 154 when dynamically selecting a format of a work to be consumed in a given context.

The illustrated table 300 in FIG. 3A includes context information that is stored as pairings of context attribute values and formats. For example, "ambient light" may be considered a context attribute, and the associated format for an ambient light value of "high" may be "audio." In some embodiments, a work may be available in multiple versions compatible with a preferred format, such as an audio book and a sound track being compatible with a format of "audio." Accordingly, the associated format may be more specific than "audio" in some embodiments and may be "audio book" or even "audio book with male narrator" where there are multiple audio book narrations available for a particular work. Further, a format of a work may be available in multiple editions or versions, for example, in an embodiment in which multiple movies have been made of a work, multiple narrators have performed readings of an audio book version of a work, or where multiple editions of an e-book have been made for a work. As such, the associated format may additionally be associated with a specific version of the format based on user preferences and/or population preferences. Additionally, some context attributes may be associated with multiple formats dependent upon other factors. For example, "ambient noise" may be considered a context attribute, and the associated format may be "text" if the dynamic format delivery service 150 detects no headphones with the requesting user device, and the associated format may be "audio" if headphones are detected.

In other embodiments, context information may be stored in a manner that describes a context without reference to specific attribute types and corresponding values. For example, a context associated with a work may be described by a word, phrase or narrative entry, such as "relaxing bedtime reading." In some embodiments, such narrative descriptions may be provided by users, and then searched by the dynamic format delivery service 150 when determining a format for a work to deliver in a given context. In other embodiments, the stored context information associated with a format may include data received from various user computing devices in association with works or other content presented by each device, such as specific GPS location data, specific time and date information, etc. Other examples of contexts include seasons, holidays, whether a user is looking at a display of the device ("face detected," and whether the user is traveling ("movement"). A user device 102 may generate or record data regarding the context in which the user consumed content. For example, a user device 102 may include one or more contextual data providers, such as a GPS antenna, a pedometer, an accelerometer, a heart rate monitor, a calendar, a thermometer, or other sensors, components, modules, or devices that collect data regarding a current context. These examples are illustrative only, and are not exhaustive. Generally described, context information may include any data associated with the behaviors or environment of a user when consuming content. Such information may be stored at the user device and transmitted to interactive computing system 110 later or in substantially real-time. In some embodiments, aspects of context information may be provided by a user directly, rather than automatically determined or recorded. For example, the user may be prompted to input (or may proactively input) context information regarding what the user is doing during content consumption.

The illustrated table 310 in FIG. 3B includes context information that is stored as pairings of works, formats, and a preferred file. For example, the preferred file information may be determined by the user behavior analyzer 152 based on a file or version of a work most frequently accessed, selected, or requested, or most highly rated by a user or a population of users. In some embodiments, the preferred file information may be based on a newest or promoted version of the work. The preferred file information may be used, in some embodiments, to select a format and version of a work to deliver to a user about which no information is available. In a particular embodiment, a work may be associated with multiple preferred files, for example, a preferred file for each format in which the work is available. Although not illustrated, works may also be associated with context attributes.

The association information may be provided by a developer of the table in some embodiments. The association information may alternatively or additionally be determined based on contexts in which a work in a format has been consumed by one or more users in some embodiments. The illustrative data displayed in tables 300 and 310 may have been determined by the components of the dynamic format delivery service 150 based at least in part on observed work and other content consumption of a number of users. In some embodiments, the user behavior analysis component 152 may receive an indication that a user has consumed or is consuming at least a portion of a digital work. In response, the user behavior analysis component 152 may determine one or more context attributes associated with the context in which the user consumed or is consuming the digital work. The user behavior analysis component 152 may then create an entry in the one or both of tables 300 and 310 that associates the determined one or more context attributes with the format of the digital work consumed by the user or with the work itself. For example, the work entitled Pride and Prejudice may have been consumed by one or more users in e-book format while relaxing before bedtime, and a majority or threshold percentage of those users may have consumed the Top Five Classics version of the e-book. Accordingly, the file for the Top Five Classics version and the format of text may be associated with the work Pride and Prejudice that may also be associated with a context attribute such as "late night" or "bedtime reading."

In certain embodiments, the context attributes may additionally include count information indicating the number of times that the given work or format of a work was consumed in a given context, information identifying the user or users that consumed the work in each context, and/or user feedback or ratings received with respect to consumption of the work in the given context (not illustrated). While table 410 illustrates context attributes associated with works, in some embodiments, context attributes may be associated with entities other than works, such as an author, a book series, a playlist, an artist, a narrator, and/or other entity types.

V. Dynamic Format Delivery Overview

Figure 4:
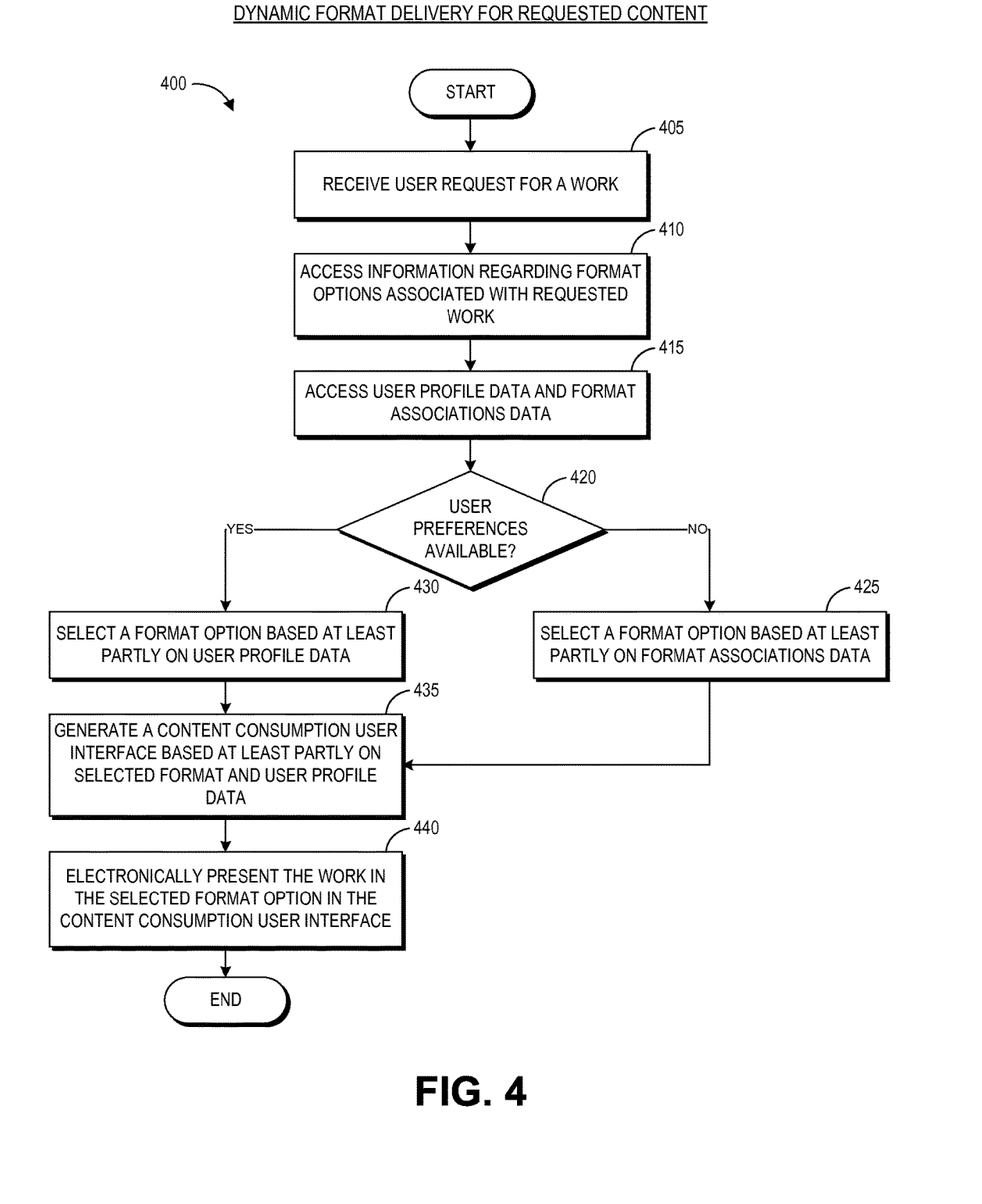
FIG. 4 illustrates a flow diagram of one embodiment of a dynamic format delivery process.

FIG. 4 illustrates an embodiment of a behavior-based dynamic format delivery process 400. While any computing system can implement the process 400, the process 400 is described as being implemented by the dynamic format delivery service 150 of FIG. 1.

The process 400 begins at block 405 in which the dynamic format delivery service 150 receives a user request for a work. For example, a user may generate a request by selecting a work for presentation from a data store of the user's acquired works or by selecting a work already acquired from the electronic catalog for presentation via streaming to the user's device.

At block 410, the format selection component 156 may access information regarding format options associated with the requested work, for example, from the work format options 166 of FIG. 1. At block 415, the format selection component 156 may access user profile data and format association data. As discussed above, the user profile data may include one or more user format preferences expressed through interaction with works or other content in the electronic catalog, and the format association data may include one or more pairings of a format and context, work, and/or file, as discussed with respect to FIGS. 3A and 3B.

At decision block 420, the process 400 analyzes the user profile data to determine whether any user format preferences are available. In some instances, a user may not have format preferences available because the user has just recently opened their account with the electronic catalog, and in some cases, the user may not have format preferences available due to user-controlled privacy settings. If there are no user preferences available, the process 400 moves to block 425 in which the format selection component 156 selects a format based at least partly on format association data. For example, preferences determined from the behavior of a population of users may be substituted for the unavailable preferences of the requesting user.

If, at block 420, the process 400 determines that user format preferences are available, then the process 400 moves to block 430 in which a format option is selected from the available formats associated with the requested work based at least partly on the user profile data. As discussed above, the user profile data may include a format preference determined from past user work consumption behavior. The user profile data may also, in some embodiments, include a current context determined from either user input or interactions of the dynamic format delivery service 150 with the user device used to request the work. In some embodiments, the current context may include information on the capabilities of the requesting user device. One or more factors from either or both of past user behavior and current context may be used to select to format option for the requested work.

At either of blocks 420 or 435, a variety of other factors may play a role in the format selection component 156 selecting a format for delivery to the user. For example, a weighted formula may be used. In some embodiments, all factors in the weighted formula may be weighted equally, and in other embodiments a particular factor or factors in the weighted formula may be assigned a heavier weight than others, and may even be weighted so heavily as to be determinative of the selected format. In some embodiments, user reviews of the different formats or files available for the work may factor in to the format selection decision. To illustrate, an audio book version of a work may receive better reviews on average than an e-book version of the work, and accordingly the user reviews factor may weigh in favor of the audio book version being selected for presentation to the user. Format preferences or limitations associated with a device being used to make the request for the work may, in some embodiments, factor in to the format selection decision. For example, the user may indicate a preference for consuming e-books on an e-book reading device of the user, and when requesting a work from the e-book reading device, such a device-specific format preference may factor in to the format selection decision. As another example, a user device may not be equipped with an audio output, or the dynamic format delivery service 150 may determine or receive information that an audio output functionality of the device is currently inoperative. Such a format limitation of the device may factor in to the format selection decision and, in some embodiments, may be weighted so heavily as to preclude selection of a format including audio output.

The process 400 then moves to block 435 in which the content consumption interface generation component 158 generates a user interface for consuming the content based at least partly on selected format and user profile data. For example, the user profile data may indicate that the user switches formats while consuming a work. Accordingly, the content consumption interface generation component 158 may generate a user interface that allows the user to see other available formats and make selections of such formats. When a new format is selected, the content consumption interface generation component 158 may modify the user interface used to present the work accordingly. The content consumption interface generation component 158 may also use context attributes, in some embodiments, to generate the user interface. For example, if a context attribute of high ambient noise is detected, then the content consumption interface generation component 158 may slow audio book presentation. If a context attribute of high ambient light is detected, then the content consumption interface generation component 158 may increase the font size of an e-book presentation in order to compensate for glare off of the device screen or display. In some embodiments, user profile data may be used to generate the user interface. For example, if user profile data indicates that the user reads slowly, the consumption interface generation component 158 may suggest a simultaneous listening to the audio book version of the work in an immersion reading experience.

At block 440, the content consumption interface generation component 158 may output the user interface for presentation of the work to the user. For example, an audio book consumption interface may be output to the user's device with an indication of how far the user has progressed in the audio book, volume controls, title, narrator information, and the like. An e-book consumption interface may include a space for the text of the e-book, page turning options, title information, author, and other user interface elements appropriate for consumption of an e-book.

VI. Context-Specific Dynamic Format Delivery Overview

Figure 5:
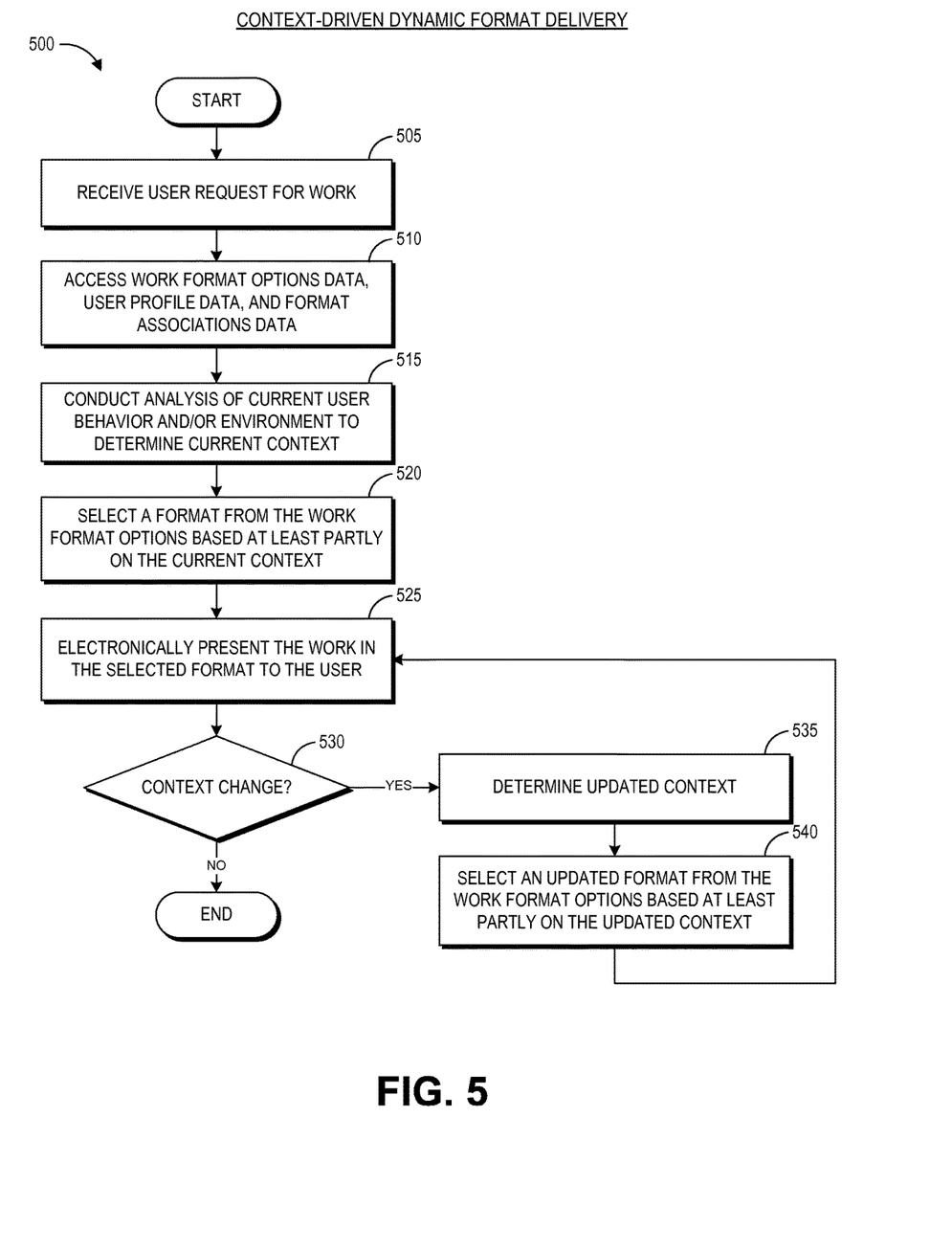
FIG. 5 illustrates a flow diagram of one embodiment of a context-driven dynamic format delivery process.

FIG. 5 illustrates an embodiment of a dynamic format delivery process 500 that analyzes a context of the requesting user device. While any computing system can implement the process 500, the process 500 is described as being implemented by the dynamic format delivery service 150 of FIG. 1.

The process 500 begins at block 505 in which the dynamic format delivery service 150 receives a user request for a work. For example, a user may generate a request by selecting a work for presentation from a database of the user's acquired works or by selecting a work already acquired from the electronic catalog for presentation via streaming to the user's device.

At block 510, the format selection component 156 accesses dynamic format delivery data including story format options data, user profile data and format association data. As discussed above, the user profile data may include a plurality of context attributes that may be used to determine the environment around the user device requesting the work. The user profile data may also include information regarding attributes of the device used to request the work.

At block 515, the format selection component 156 analyzes the current user behavior and context attributes of the user's environment to determine a current context. As discussed above, ambient noise may be used to determine whether the user's device (and presumably therefore also the user) are in a public space or a private space. Color and intensity of ambient light may be used to determine whether a user is outdoors or indoors, and whether it is day or night in the user's environment. Time data may also be used to determine whether it is day or night, and may be used to determine a season, day of the week, or holiday. GPS data may be used to determine a user's location or that the user is moving at a speed that indicates travel. Such context data may be useful because, in some embodiments, it may be desirable to detect, for example, from a combination of GPS data and time and date data indicating that a user is driving a car to work, so that an e-book format will not be delivered to the user. As discussed above, device-specific format preferences or limitations can also factor in to the format selection decision. Accordingly, at block 520, the format selection component 154 selects a format for the work from the story format options data.

At block 525, the work is presented or output for presentation to the user in the selected format. In some embodiments, this may involve generation of a user interface by the content consumption interface generation component 158, as discussed above. For example, the user profile data may indicate that the user switches from context to context while consuming a work. Accordingly, the content consumption interface generation component 158 may rank or obtain a ranking of the available format for a work, for example, based on a predicted next context, and may output the ranking to the user for selection of a different format if the next context calls for a new format of the consumed work. Next, at block 530, the dynamic format delivery service 150 determines whether the context surrounding the user device has changed. This may involve an analysis of context attributes, or may be in response to user input indicating a change in context. This element may be performed at intervals during consumption of the work by the user. If the context has not changed, then the process 500 may loop through determining whether the context has changed periodically or continuously until the user has finished consuming the work. If the context has changed, then the process 500 moves to block 535 to determine an updated context. At block 540, the format selection component 154 selects a new format based at least partly on the updated context.

In some embodiments, a change in context may be anticipated by the dynamic format delivery service. To illustrate, GPS and time data from the user device may indicate that the user is commuting home from work by subway, and accordingly an audio book format may be selected for the current context. The GPS and time data as well as the user profile may indicate that the user will continue to consume the work once reaching home, but may prefer an e-book or an immersion reading experience. The content consumption interface generation component 158 may output the user interface for presentation of the work to the user. For example, an audio book consumption interface may be output for the user's commute, and the content consumption interface generation component 158 may also output an option to select one of the e-book or the immersion reading experience. In other embodiments, the content consumption interface generation component 158 may initially output an interface for the current context and may subsequently output a new interface if the context is determined to change, or if the change in context is determined to be material to the currently selected format.

VII. Example User Interface

Figure 6:
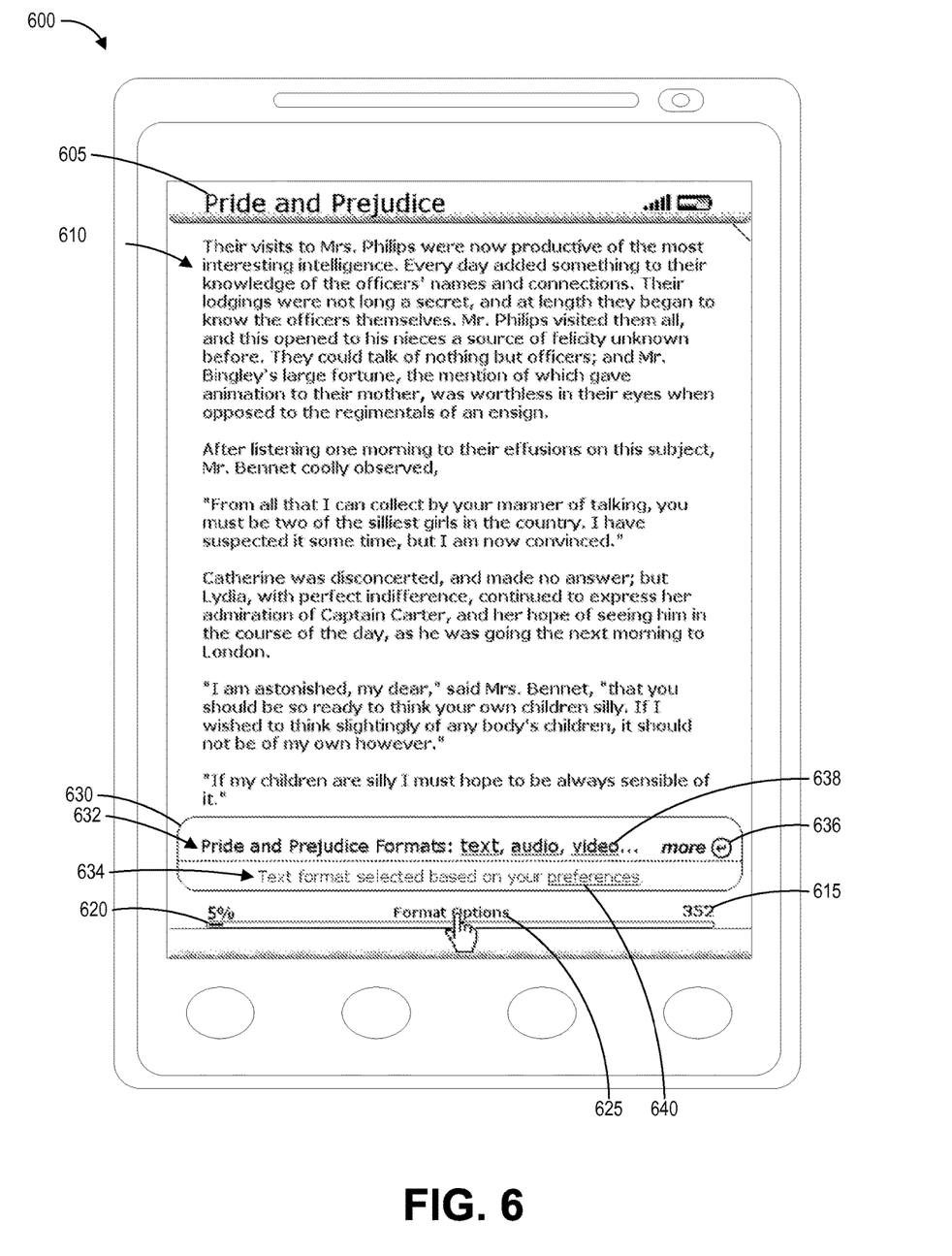
FIG. 6 illustrates an embodiment of a user interface displayed on a user computing device that displays information about format delivery options and preferences.

FIG. 6 illustrates an example user interface 600 for presenting a dynamically selected work format to a user. In the illustrated embodiment, an e-book format has been selected for presenting the work to the user. Accordingly, the user interface 600 includes the work title 605, Pride and Prejudice, and a text area 610 for displaying a page of the e-book. The user interface 600 also includes a page count 615 and a progress indicator 620.

The user interface also includes a selectable option 625 to view format options, selection of which causes presentation of a format information portion 630 to the user. As illustrated, the user may hover a cursor over the selectable option 625 to be presented with the format information portion 630 in the same user interface as the e-book text 610. However, other arrangements are possible in other embodiments.

The format information portion includes a listing of available formats 632, illustrated as text, audio, and video, that includes user-selectable options 638 to be presented with alternate formats of the work. Selecting the user-selectable option 638 may cause presentation of the selected format of the work, or may present the user with options for multiple versions of the work that fall into that format description. The format information portion 630 also includes a user-selectable option 636 to see more format options. The format information portion 630 further includes a preferences statement 634 indicating that the text format was selected based on the users preferences, and the statement 634 includes a user-selectable option 640 to view and/or modify format preferences.

Selection of the user-selectable option 640 to view and/or modify format preferences may cause presentation of a new interface on the user device that can allow the user to view and/or modify the format, context, and device associations in their user profile. In some embodiments, this preferences-setting user interface may be provided to a user when opening an account or at other predetermined times in order to get user input or feedback regarding format preferences.

VIII. Additional Embodiments

Although the user profile data including format preferences and context associations for consumption of works has been discussed herein primarily in the context of dynamic format delivery for a requested work to a user device, in some embodiments the user profile data and/or behavioral data from a population of users can be used in other contexts. For example, the format preferences of a user can be used to rank the order in which search or browse results will be presented to the user. To illustrate, behavioral data collected with respect to the user may indicate a preference for works available in both e-book format and audio book format. Accordingly, search or browse results of works that are available in both formats can be ranked higher or presented more prominently to the user. In some embodiments, a user's behavioral data may indicate a preference for consuming audio books on a currently used device. Accordingly, the results of search or browse requests made from the currently used device may be tailored to the audio book preference, for example, by ranking works available in audio book format more highly, or by presenting the audio book versions of works and not the e-book or movie versions of works. Format preferences determined from behavioral data from a population of users may also be used to rank search or browse results.

In further embodiments, works or specific formats of works can be recommended to users, for example, while the users are browsing an electronic catalog or other network application. Some or all of user format preferences, behavioral data from a population of users, and user reviews can be used for recommending works or specific formats of works to users. A current context or environment of a user device, as well as device-specific format preferences and limitations, can be determined. These factors may be compared to the format association data 164 in order to select a work or a format of the work to recommend to a user.

IX. Conclusion

Many embodiments of systems and processes have been described for generating user format preference data and using that data to select and/or deliver a specific format of a work. Among many other features described herein, these systems and processes can dynamically collect data representing a user's preferences respecting specific contexts and formats, and can store this data in association with the user. The systems and processes can also make use of that data to dynamically select a format for a requested work in order to provide the user with a format tailored to that specific user's consumption habits. Moreover, data representing preferences of a population of users, context attributes, or device-specific format preferences may further contribute to selecting a work format.

X. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. Further, the headings used herein should not be used to limit the scope of the claims, as they merely illustrate example embodiments.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The elements of a method, process, or algorithm described in connection with the embodiments disclosed herein can be embodied directly in physical computer hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain examples described herein can be embodied within a form that does not provide all of the features and benefits set forth herein, as some features can be used or practiced separately from others.

What is claimed is:

1. A computer-implemented method comprising:
  as implemented by one or more computing devices configured with specific executable instructions,
    receiving a request from a user for a work, wherein the work is available for selection in a plurality of formats from an electronic catalog;
    determining a current context of the user, the current context representing an environment in which the user made the request for the work,
    accessing profile data for the user, wherein the profile data for the user indicates that the current context of the user is associated with a context attribute;
    accessing format association data comprising an association of the context attribute of the current context with at least some of the plurality of formats;
    in response to determining the current context representing the environment in which the user made the request for the work, (i) selecting a format of the at least some of the plurality of formats for the work based at least partly on the profile data for the user and the format association data, wherein the format is associated with the context attribute of the current context, and (ii) predicting an updated context to which the user will switch while consuming the work;
    generating a user interface based at least partly on the selected format and the updated context;
    causing electronic delivery of the work in the selected format for presentation to the user via the user interface;
    determining, during consumption of the work by the user, that the current context of the user has changed to the updated context;

identifying a different format of the plurality of formats for the work that is associated with the updated context; and electronically outputting the work for presentation to the user in the different format.

2. The computer-implemented method of claim 1, wherein the profile data of the user includes past work consumption behavior data indicating that the user has previously consumed the work in the selected format in the context.

3. The computer-implemented method of claim 1, wherein the profile data for the user comprises a format preference determined from past work consumption behavior of the user.

4. The computer-implemented method of claim 3, wherein the format preference is determined from past work consumption behavior of the user on a device utilized by the user to submit the request for the work.

5. The computer-implemented method of claim 1, wherein the profile data for the user indicates that the user switches from the context to the updated context, and wherein predicting the updated context is based at least partly on the profile data for the user.

6. A system comprising:

physical data storage configured to store user profile data, format association data, and work format options data, the work format options data comprising a plurality of format options in which a plurality of works are available for selection by the user from an electronic catalog;

one or more hardware processors in communication with the data store, the one or more hardware processors configured to at least:

identify a user format preference based at least partly on a past user interaction with at least one work in the electronic catalog;

receive a request from the user for a requested work of the plurality of works;

determine a current context of the user, the current context representing an environment in which the user made the request for the work;

access the format association data comprising an association between a context attribute of the current context and at least some of the plurality of format options;

in response to determining the current context representing the environment in which the user made the request for the work, (i) select a format option for the requested work from the at least some of the plurality of format options based at least partly on the identified user format preference, wherein the format option is associated with the context attribute of the current context, and (ii) predict an updated context to which the user will switch while consuming the work;

electronically output the requested work for presentation to the user in the selected format option via a user interface generated based at least partly on the selected format option and the updated context;

determine, during consumption of the requested work by the user, that the current context of the user has changed to the updated context;

identify a different format option of the plurality of format options that is associated with the updated context; and electronically output the requested work for presentation in the different format option.

7. The system of claim 6, and wherein the requested work comprises a literary work, and wherein the plurality of format options comprise two or more of an audio book, a movie, and an e-book.

8. The system of claim 6, wherein the one or more hardware processors is further configured to at least store the identified user format preference in association with the user in the user profile data.

9. The system of claim 6, wherein the one or more hardware processors is further configured to at least generate a user interface for presenting the plurality of format options to the user.

10. The system of claim 6, wherein the past user interaction comprises an explicit indication of a format preference for the at least one work.

11. The system of claim 10, wherein the explicit indication is a selection by the user of a change format option for the at least one work.

12. The system of claim 6, wherein the past user interaction comprises an implicit indication of a format preference for the at least one work.

13. The system of claim 12, wherein the implicit indication is inferred from the past user interaction with the at least one work.

14. The system of claim 6, wherein the user format preference is further identified based at least partly on at least one of current session data, browsing history, a click history, or a purchase history.

15. The system of claim 6, wherein the one or more hardware processors is further configured to at least one of prefetch the requested work to a user device used to request the requested work or initiate streaming of the requested work to the user device.

16. The system of claim 6, wherein the format option is further selected based at least partly on a limitation associated with a user device used to request the requested work.

17. The system of claim 6, wherein the user format preference is further identified based at least partly on the interactions of a population of users with the at least one work.

18. A non-transitory computer readable storage medium storing computer executable instructions that, when executed by a computer system, configures the computer system to perform operations comprising:

receiving, from a user device, of a user, a request for a work, the work available for selection by the user from a content site in a plurality of format options;

determining a current context of the user device, the current context representing an environment in which the user made the request for the work;

accessing format association data comprising an association between a context attribute of the current context and at least some of the plurality of format options;

in response to determining the current context representing the environment in which the user made the request for the work, (i) selecting a format option from the plurality of format options based at least partly on association of the format option with the context attribute of the current context, and (ii) predicting an updated context to which the user will switch while consuming the work;

electronically delivering the work in the selected format option for presentation to the user via a user interface generated based at least partly on the selected format option and the updated context;

determining, during consumption of the work by the user in the selected format, that the current context of the user has changed to an updated context;

identifying a different format option of the plurality of formats options that is associated with the updated context; and electronically outputting the requested work for presentation in the different format option.

19. The non-transitory computer readable storage medium of claim 18, wherein the current context attribute indicates at least one of an environment, an ambient noise level, an ambient light color, an ambient light level, a time, a day, a date, a season, a movement speed, a format preference, a format limitation, or a user device attribute.

20. The non-transitory computer readable storage medium of claim 18, wherein the current context of the user is determined based at least partly on at least one of GPS data, time data, date data, input received from a microphone of the user device, and input received from an imaging device of the user device.

21. The non-transitory physical computer storage medium of claim 18, wherein the operations further comprise:

determining a plurality of current context attributes; and applying a weighted formula to determine the current context from the plurality of current context attributes.

22. The non-transitory computer readable storage medium of claim 18, wherein the operations further comprise:

accessing user profile data including a user format preference; and selecting the format option from the plurality of format options based at least partly on the current context and the user format preference.

23. The non-transitory computer readable storage medium of claim 18, wherein determining the current context comprises:

receiving input captured by a microphone of the user device; and determining an ambient noise level around the user.

24. The non-transitory computer readable storage medium of claim 18, wherein determining the current context comprises:

receiving input captured by an imaging component of the user device; and determining an ambient light level around the user.

25. The non-transitory computer readable storage medium of claim 18, wherein determining the current context comprises:

receiving location data from the user device and determining location and speed of movement of the user.

* * * * *

UNITED STATES PATENT AND TRADEMARK OFFICE
CERTIFICATE OF CORRECTION

PATENT NO. : 9,792,003 B1
APPLICATION NO. : 14/040495
DATED : October 17, 2017
INVENTOR(S) : Guy Ashley Story, Jr.

Page 1 of 1

It is certified that error appears in the above-identified patent and that said Letters Patent is hereby corrected as shown below:

In the Claims

In Column 20 at Line 47, In Claim 18, change "device," to --device--.

Signed and Sealed this
Sixth Day of March, 2018

Andrei Iancu
*Director of the United States Patent and Trademark Office*